J. H. McCAIN.
AMMONIA COMPRESSOR.
APPLICATION FILED DEC. 29, 1916.
1,308,288.
Patented July 1, 1919.
2 SHEETS—SHEET 2.
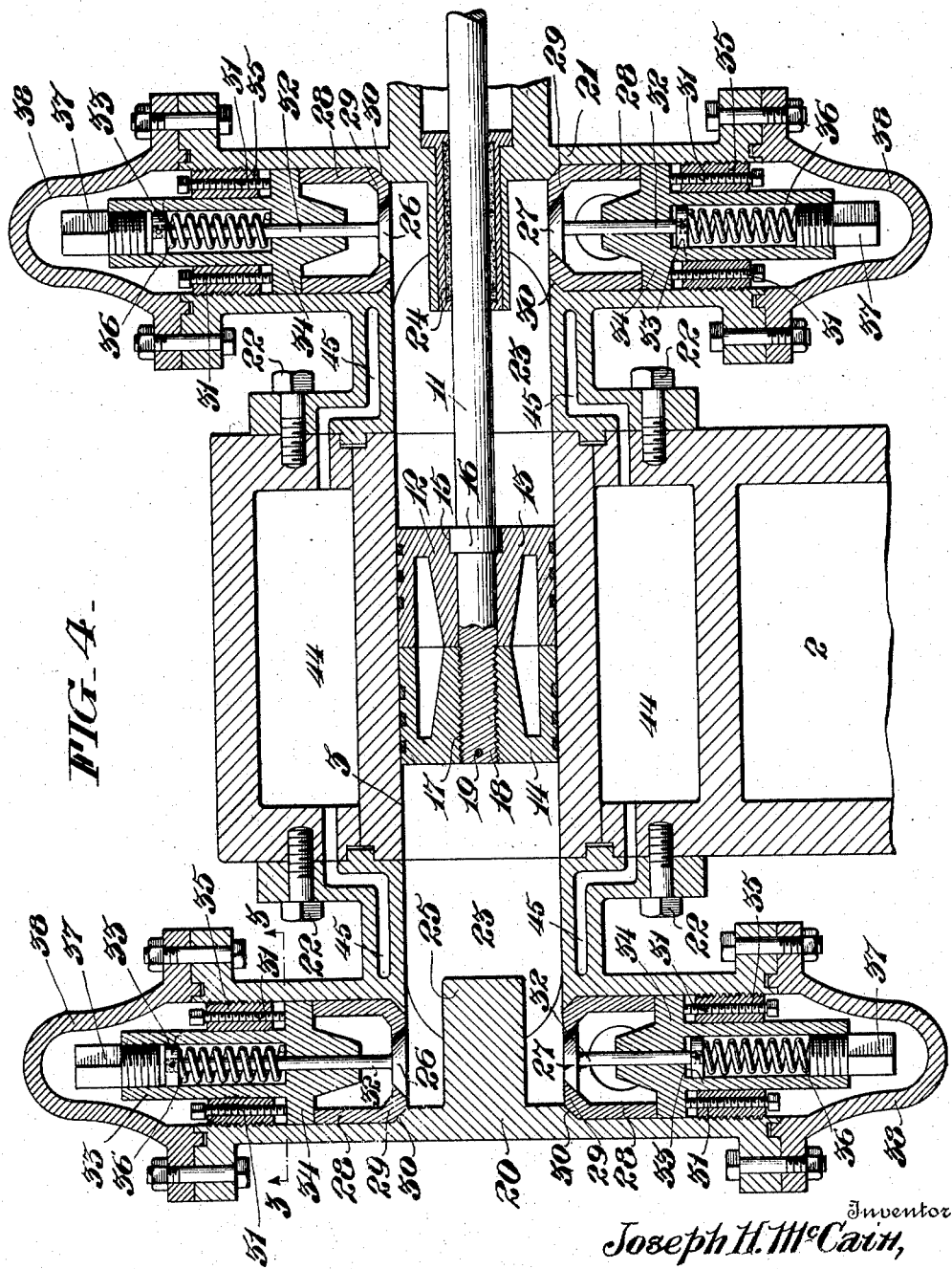
Inventor
Joseph H. McCain,

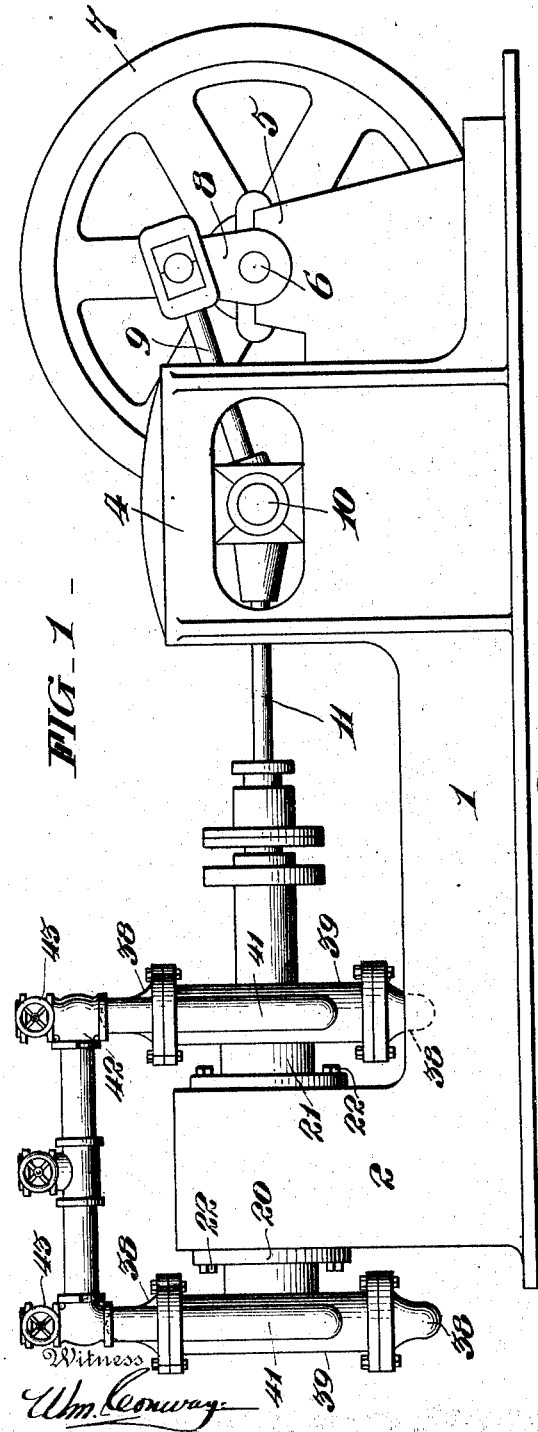
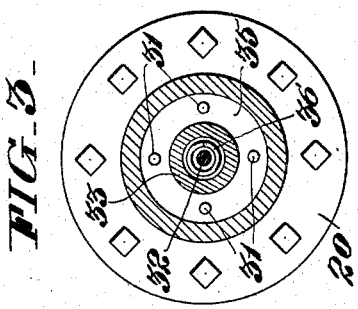
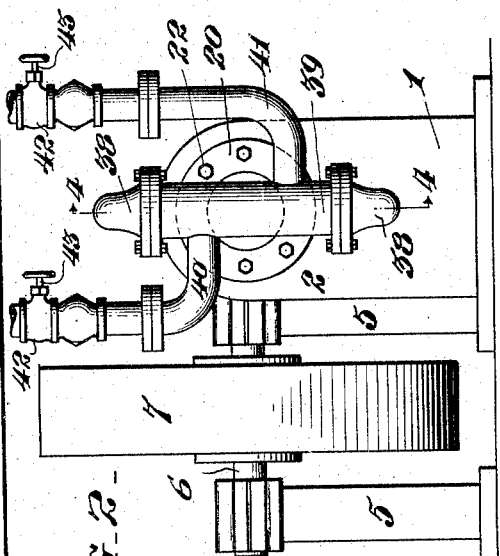

UNITED STATES PATENT OFFICE.

JOSEPH HARVEY McCAIN, OF PHILADELPHIA, PENNSYLVANIA.

AMMONIA-COMPRESSOR.

1,308,288.	Specification of Letters Patent.	Patented July 1, 1919.

Application filed December 29, 1916. Serial No. 139,671.

*To all whom it may concern:*

Be it known that I, JOSEPH H. MCCAIN, a citizen of the United States, residing at Philadelphia, in the county of Philadelphia and State of Pennsylvania, have invented certain new and useful Improvements in Ammonia-Compressors, of which the following is a specification.

My invention relates to improvements in ammonia compressors, the object of the invention being to provide a compact, strong, and efficient compressor having an improved arrangement of valves which are capable of adjustment to prevent leakage, and to perfectly control the flow of fluid.

A further object is to provide improved means for adjusting the valve seats so as to prevent leakage and permit replacement of worn or injured parts.

With these and other objects in view the invention consists in certain novel features of construction and combinations of parts as will be more fully hereinafter described and pointed out in the claims.

In the accompanying drawings:

Figure 1 is a view in side elevation, illustrating my improvements.

Fig. 2 is a view in end elevation.

Fig. 3 is a view in section on the line 3—3 of Fig. 4, and

Fig. 4 is a view in longitudinal section on an enlarged scale, on the line 4—4 of Fig. 2.

1 represents the bed of my compressor, having a standard 2 at one end lined to form the compression cylinder 3, and provided at its other end with a cross head guide 4, and a shaft bearing 5. 6 is the drive shaft having the ordinary fly-wheel 7, and provided with a crank arm 8, connected by a rod 9 with a cross head 10.

The cross head 10 is connected to the piston rod 11, and the latter is provided with a piston 12, in cylinder 3. The piston 12 is made in two halves, 13 and 14, the former having a recess 15 to receive an annular enlargement 16 on rod 11, and the latter internally screw-threaded as shown at 17 to screw on to the threaded end 18 of rod 11.

A pin 19 holds the piston section 14 from accidental turning movement, yet permits the piston to be removed whenever desired.

To opposite sides of the standard 2, heads 20 and 21 are secured by means of screws 22. These heads 20 and 21 are in most respects precisely alike. They each have hollow chambers 23 registering with cylinder 3, and forming continuations of the cylinder 3.

Head 21 is provided with a bearing 24, through which the rod 11 projects, and head 20 has an inwardly projecting enlargement 25 corresponding in size to the size of the bearing so as to insure an equal displacement at both ends of the cylinder.

The heads 20 and 21 are both provided with inlet and exhaust valves 26 and 27 respectively. All of these valves engage removable valve seats 28, having tapering inner ends 29 which engage tapering shoulders 30 in the heads, and held tightly in place by set-screws 31.

Each valve is made with a stem 32 guided in a barrel 33, and each barrel is made with an enlarged head 34 bearing against the valve seats 28. Screw-threaded blocks 35 are screwed into the heads, and are in the form of rings surrounding the barrels 33. Blocks constitute retaining members and carry the set-screws 31 which press the heads 34 against the seats 28, and permit adjustment of the parts to insure a gas tight juncture.

Coil springs 36 are located in the barrels 33, and hold the valves normally in closed position. Screw-threaded plugs 37 are screwed into the outer ends of the barrels closing them, and operating to permit adjustment of the springs for the exhaust valves 27.

Removable caps 38 inclose the outer ends of the barrels 33, and in fact, close the outer ends of the valve casings indicated by the reference numeral 39. The valve casings at each end of the cylinder, are vertically disposed and afford a ready connection for the supply and exhaust pipes 40 and 41 respectively.

These pipes 40 and 41 are connected with suitable manifolds 42, and the latter are provided with valves 43 which control the flow of fluid as may be desired.

The cylinder 3 is water-jacketed as shown at 44, and this water jacket 44 connects with water chambers 45 in the heads 20 and 21.

The operation of my improved compressor is as follows:

The reciprocation of piston 13 causes an intake of gas and a compression and exhaust thereof at both ends of the cylinder, so that the maximum of capacity may be had, but if desired, the valves 43 may be operated so as to compress at one end of the cylinder only. In the event of injury to any of the parts of the valves or their seats, repairs and alterations can be made without putting the compressor entirely out of commission, and all parts can be adjusted to suit conditions. By reason of the enlargement 25, and the stuffing box 24, any possibility of the inlet valves 26 falling into the cylinder is prevented, as they can move inwardly but a short distance, and could not possibly injure the cylinder or piston by reason of accidental falling, as is the case with many types of compressors in general use.

Various slight changes may be made in the general form and arrangement of parts described without departing from my invention, and hence I do not limit myself to the precise details set forth, but consider myself at liberty to make such changes and alterations as fairly fall within the spirit and scope of the appended claims.

Having fully described my invention, what I claim as new and desire to secure by Letters Patent is:

1. In an ammonia compressor, the combination of a valve casing having a reduced inner end, a valve seat member removably fitted against the inner end of the casing, a barrel having an enlarged head engaging the seat member, valve mechanism carried by the valve, a retaining member threaded into the valve casing, set screws carried thereby for holding the barrel and removable seat member in position, a gas tight closure for the end of the barrel and threaded therein and a cap separate from said retaining member and closure, closing the outer end of the casing.

2. An ammonia compressor, comprising a cylinder, a valve casing on the cylinder and having a reduced inner end, a valve seat removably located against the inner end of the casing, a barrel having an enlarged head engaging the seat, a block having a central opening receiving the barrel and screwed into the casing, set-screws in the block pressing the head against the valve seat, a valve, a stem on the valve projecting into the barrel, and a spring in the barrel normally holding the valve in closed position.

In testimony whereof I have signed my name to this specification in the presence of two subscribing witnesses.

JOSEPH HARVEY McCAIN.

Witness:
ELEANOR F. MURRAY.

Copies of this patent may be obtained for five cents each, by addressing the "Commissioner of Patents, Washington, D. C."